United States Patent
Haberkern et al.

[15] 3,690,749
[45] Sept. 12, 1972

[54] FILM PROJECTOR

[72] Inventors: Ottmar Haberkern, Wiesbaden; Gunter Heller, Wiesbaden-Biebrich, both of Germany

[73] Assignee: Ottmar Haberkern, Wiesbaden, Germany

[22] Filed: Sept. 21, 1970

[21] Appl. No.: 73,742

[52] U.S. Cl. ................................. 352/108, 352/143
[51] Int. Cl. ............................................. G03b 41/06
[58] Field of Search ........................... 352/108, 143

[56] References Cited

UNITED STATES PATENTS

| | | | |
|---|---|---|---|
| 2,238,719 | 4/1941 | Detartas | 352/72 |
| 3,138,057 | 6/1964 | Castedello | 352/129 X |
| 1,541,218 | 6/1925 | Higginson | 352/108 |
| 3,163,080 | 12/1964 | Miller | 355/40 X |
| 1,564,295 | 12/1925 | Thorner | 352/108 |

Primary Examiner—Samuel S. Matthews
Assistant Examiner—Monroe H. Hayes
Attorney—Allison C. Collard

[57] ABSTRACT

A film projector, preferably for projecting films in cartridges, having a projection lamp separated from the film gate by a heat insulated separation wall within the projector housing. The light is directed through a light guide rod onto the film frame to be projected. The film runs continuously, and the optical standstill of the picture is performed by a prismatic mirror. The prismatic mirror is rotated by a drive which is engaged to the film perforations.

7 Claims, 2 Drawing Figures

Inventor:
OTTMAR HABERKERN
GÜNTER HELLER

By *[signature]*

Attorney

Inventor:
OTTMAR HABERKERN
GÜNTER HELLER

FILM PROJECTOR

This invention relates to a film projector for preferably projecting films which are in cartridges or cassettes.

Conventional motion picture film projectors are disadvantageous in that they require a rather large projector housing because of the distance required between the projection lamp and the projected film frame. The projector housing must also be rather spacious because of the numerous deflector mirrors required to deflect the projection light onto the film, and because of the substantial heat which is developed within the projection lamp. This heat developed by the projection lamp is also detrimental to the heat sensitive film. This is particularly disadvantageous in home movie projectors, which should be designed not to take up too much space both during the operation and while being stored.

Accordingly, the subject invention provides a film projector which is both compact and versatile. In the invention, the projection lamp is separated from the film gate within the projector housing by a separation wall. Furthermore, the light is guided through a glass light guide rod which is bent, or has a plurality of bents, for extension through the separation wall. The light is guided through the guide rod and onto the projected film frame.

The favorable separation of the projector lamp from the film avoids a detrimental heat influence on the heat sensitive film. The projection lamp can now be mounted at a readily available space, independent from the light beam, after the electrical and mechanical parts are installed. In accordance with the present invention, no special space is needed for the projection lamp, since there is always a free space on the uppermost part of the projector housing which cannot be used for any other purpose after all the electrical and mechanical parts are installed. The use of a glass light guide rod for transmitting and guiding the light of the projection lamp onto the film frame has further advantages. Practice has shown that the loss of light of a glass light guide rod is 10 percent less than with lens condensers which were arranged between projection lamp and film. The projection lamp thus does not have to be too powerful to achieve the same lighting results.

In accordance with the present invention, the separation wall for the projection lamp and the film can be simultaneously used as a bearing or trunnion surface for all movable parts of the projector, due to the fact that the separation wall extends along the entire projector housing. Furthermore, a window can be provided in this separation wall for the light beam. This construction not only permits the projector to be a compact, but also provides advantages in its actual manufacture. All operating parts can be installed in one manufacturing step and are easily accessible for possible repairs or inspection.

The invention, permits an intensive space saving, since the outer measurements of the projector housing are diminished by mounting a multi-cornered prismatic mirror directly behind the film frame to be projected. The wall, which separates the projection lamp from the film, is also the bearing surface for the rotatable mirror which projects the light for each frame to provide the optical standstill of the picture. This effect is achieved because the prismatic mirror moves opposite to the movement of the film, and deflects the picture to a second mirror, which is inclined in an angle of 45° with respect to the optical axis of the beam from the prismatic mirror. An objective lens is arranged at an inclined angle of 45° with respect to the reflecting face of the second mirror.

The invention also simplifies the drive of the prismatic mirror to obtain a synchronous movement between the film and the prismatic mirror. The prismatic mirror carries a sprocket wheel which engages the perforations of the film. The prismatic mirror is thus actuated by movement of the film so that a synchronous movement is achieved. It is thus only necessary to provide a picture deflection lens in the beam of the projection lamp. The picture deflection lens permits the picture, moving through the light beam, to be deflected opposite to its moving direction. The deflected picture is directed onto the rotating prismatic mirror and is brought to a brief optical standstill, due to the pivoting of the planar prismatic faces.

The inventive device is thus advantageous in various ways. The conventional multi-stage drive for the prismatic mirror is no longer required so that the device is less expensive, and its operation greatly improved. Furthermore, possible disturbing uneven movements of the film are avoided so that the picture quality is enhanced. The light beams which are emitted from the objective lens to a 90° turnable mirror which is inclined by about 45° against the beam, are reflected either to the projection screen directly or to a further deflection mirror, depending on the position of the mirror. This contributes to the compact construction of the device and permits the picture to be projected on either a projection screen or on a mat screen by simply moving a deflection mirror.

It is, therefore, an object according to the present invention to provide a film projector which utilizes a glass-like guide rod to provide a more compact and efficient apparatus.

It is another object according to the present invention to provide a film projector which is simple in design, inexpensive in cost and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views.

Figure 1:
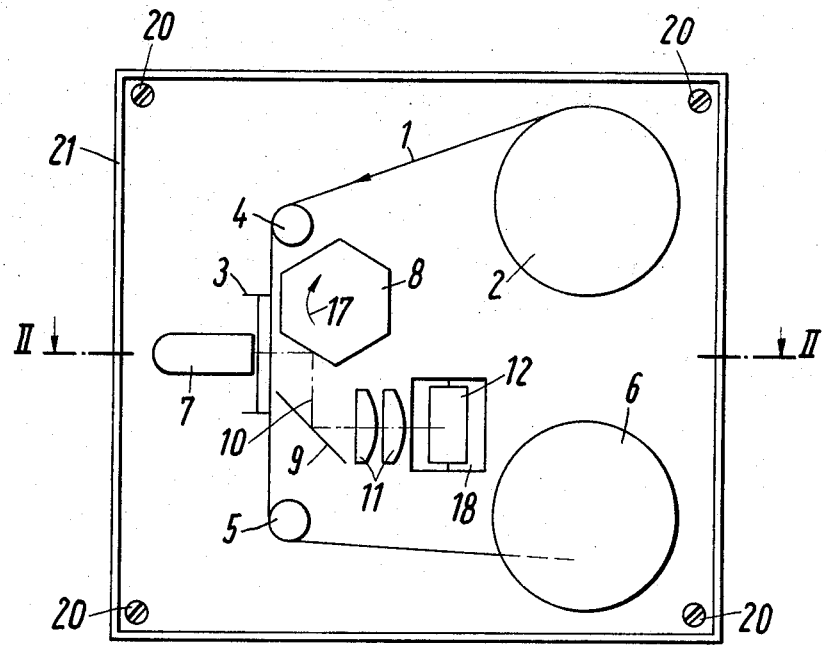
FIG. 1 is a side plan view of the inventive film projector.

Referring to FIG. 1, film 1 runs from spool 2 through a film gate 3. Return rollers 4 and 5 guide film 1 to spool 6. Film gate 3 is constructed in a known manner, having a window (not shown) for receiving the projection light which exits from a glass light beam 7. The light, which passes through film 1, is deflected downwardly by 90° to a stationary mirror 9 by the planar face of a mirrored prism such as hexagonal prism 8, which is in the path of light beam 10 from the projection lamp. Arrow 17 indicates the direction of rotation of rotating mirror 8. Stationary mirror 9 effects a further deflection of light beam 10 by 90°, so that light beam 10 passes through objective lens 11 and onto pivotable mirror 12. Pivotable mirror 12, as shown in its position of FIG. 1 and FIG. 2, deflects light beam 10 to deflecting mirror 13 which is positioned at an angle of 45° with respect to light beam 10. The deflecting mirror 13 is arranged within projector housing 21. The picture is projected from deflecting mirror 13 onto a screen 14.

Figure 2:
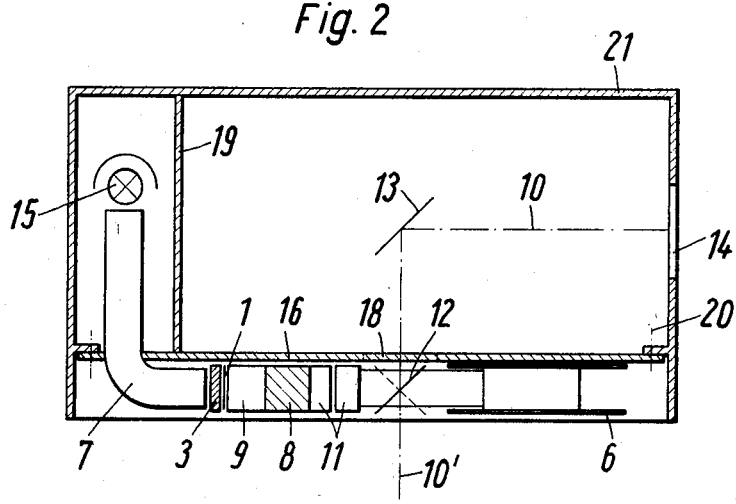
FIG. 2 is a partial cross-sectional view taken along section II—II of FIG. 1.

When pivotably mounted mirror 12, which is located in front of window 18 of projector housing 21, is pivoted by 90° from its position indicated in dark lines into the position indicated by dotted lines in FIG. 2, mirror 12 then deflects light beam 10 which exits from the objective lens 11 in the direction of light beam 10'. The picture can now be projected onto a projection screen which can be positioned outside of projector housing 21. The commonly known projector screen is not shown here.

FIG. 2 also shows the spaced separation of projection lamp 15 and film 1 by the removable separator wall 16. The light, which is emitted from projection lamp 15, is guided to film gate 3 by a glass light guide rod 7, which extends through separator wall 16 and is deflected a right angle. The light then travels the same way, as already described above, namely, through rotating hexagonal prism 8. Despite the extremely compact construction, the heat which is developed by the projection lamp cannot reach film 1, because separator wall 16 as well as glass light guide rod 7 constitute a heat insulator. Furthermore, it should be noted that due to the efficient light transmission through the glass light guide rod 7, a high powered projection lamp 15 is not required. Therefore, the heat development within the inventive projector is especially low, serving as additional safety factor against undesirable heating of the film. Wall 19 protects projection lamp 15 with respect to screen 14.

Separation wall 16 not only serves to protect film 1 against the heat emitted from the projector lamp 15, but also is a trunnion surface, and receives all bearings of the rotating parts of the projector. These rotating parts include prism 8, spools 2 and 6, and pivotable mirror 9. Since separation wall 16 is mounted by means of only four screws 20 on projector housing 21, it is an easily mountable construction element. This easy mounting facilitates the access to all parts mounted therein in case of repairs, and also lends itself to a very inexpensive mass production.

Figure 3:
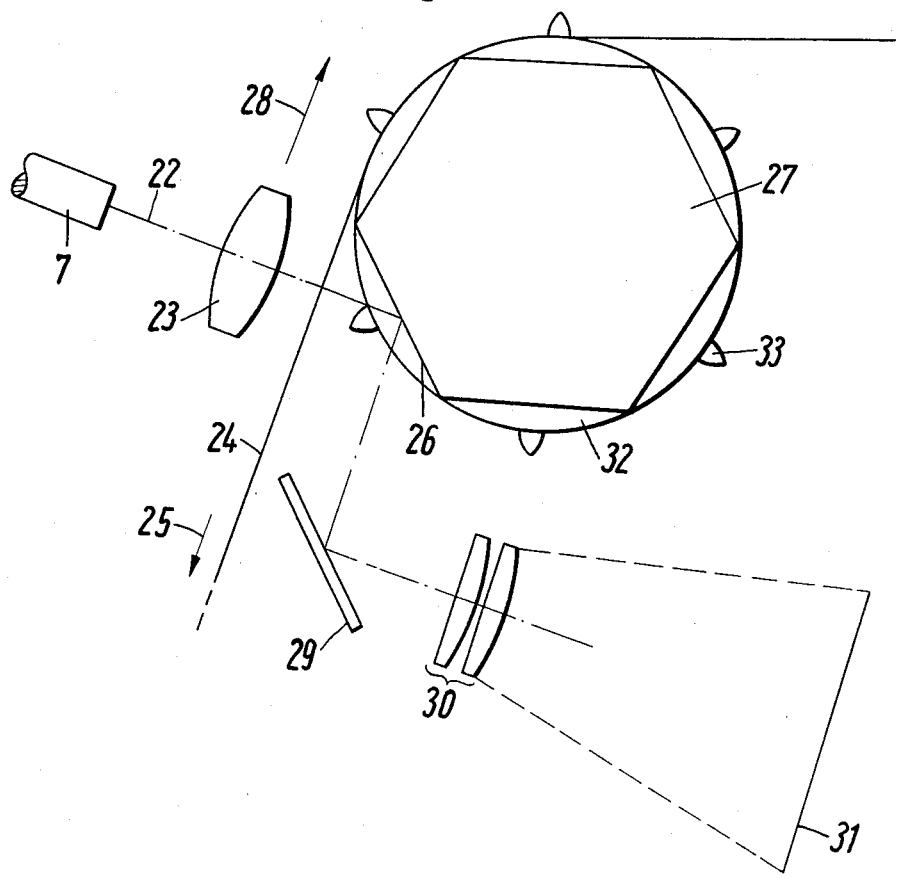
FIG. 3 is a schematic view of the optical system of the film projector.

In FIG. 3, the projector light, which is emitted from a light source, such as glass light guide rod 7 and indicated by dotted line 22, is guided to picture deflection lens 23, and is directed to film 24 in the running direction of the film, indicated by arrow 25. The picture or image which is directed to mirror face 26 of prism 27, which is in the light beam of the projector light, travels or pivots upwardly during the downward travel of the film, that is, in the direction of arrow 28. At that point, the picture is brought to a brief or momentary optical standstill due to mirror face 26 which is pivoted in an opposite direction. The resultant image is directed to stationary deflection mirror 29, from which it is emitted to the optical lens 30. Lens 30 projects the picture in an enlarged view onto a projection screen 31.

Figure 4:
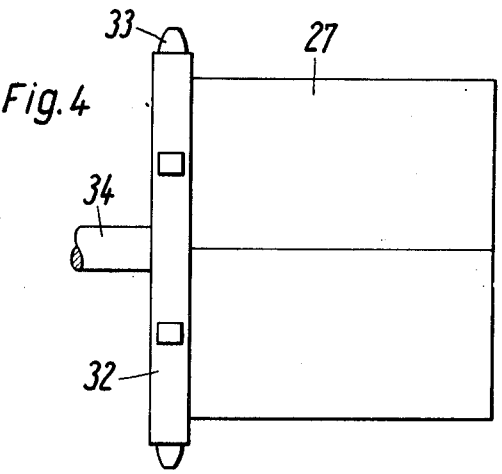
FIG. 4 is a front plan view of the hexagonal prismatic mirror.

Prismatic mirror 27 carries a sprocket wheel 32, as can be seen in FIG. 4, the teeth of which engage the film perforations. Prism mirror 27 is thus rotated synchronously with film 24. The bearing of prism mirror 27 is carried out by a trunnion 34 located in a wall of the projector housing (not shown).

While only a single embodiment of the present invention has been shown and described, it will be obvious that many changes and modifications may be made thereunto without departing from the spirit and scope of the invention.

What is claimed is:

1. In a motion picture film projector, including a feed spool and a take-up spool, a projection lamp, a film gate, at least one projection lens, and a plurality of reflective mirrors for transmitting the light from the projection lamp to and from the projection lens and to a projection screen, the combination comprising:

a housing;

a first stationary planar wall, affixed to the inside surface of one of the walls of said housing and disposed perpendicular thereto;

a plurality of flanges, affixed to the inside surfaces of at least two of the other walls of said housing and disposed perpendicular thereto and to said first wall disposed in said housing;

a second wall, slidably disposed in said housing parallel to said flanges and perpendicular to said first wall, so as to abut the end of said first wall and said flanges and form at least two compartments in said housing, the projection lamp being disposed in a first one of said compartments, and said second wall being removable from said housing and including a first aperture extending therethrough and opening into said first one of said compartments;

means for detachably securing said second wall to said flanges; and an elongated, L-shaped, glass light guide rod, disposed through said first aperture in said second wall so that one end thereof is positioned adjacent the projection lamp and the other end thereof is disposed parallel to the outside surface of said second wall adjacent the film gate of the projector, for guiding light rays emitted by the projection lamp from the projection lamp to the film gate.

2. The combination as recited in claim 1, wherein the film gate, feed and take-up spools, projection lens, reflective mirrors and said light guide rod are mounted on said second wall so as to be removable from the projector housing with said second wall.

3. The combination as recited in claim 1; wherein said second wall further comprises a second aperture, disposed therein so as to open into the second of said compartments, through which light rays from the projection lens are directed into the second of said compartments in said housing, and further comprising a projection screen, mounted in one wall of said housing and a first deflection mirror, disposed in said second of said compartments for directing light rays transmitted through said second aperture to said projection screen.

4. The combination as recited in claim 3, further comprising a pivotable mirror, mounted on said second wall adjacent said second aperture, and pivotable through an angle of 90° into first and second positions for deflecting light rays transmitted by the projection lens in one of two oppositely directed paths perpendicular to the path of the light rays transmitted from the projection lens, said light rays being projected through said second aperture to said projection screen in one of said positions, and outwardly, perpendicular to said housing and said second wall, towards a remote projection screen in the other of said positions.

5. The combination as recited in claim 4, further comprising a polygonal mirrored prism, pivotably mounted on said second wall adjacent the film gate, means for rotating said prism synchronously with the movement of the motion picture film, a second deflection mirror, mounted on said second wall below said prism and having its reflective surface inclined at an angle of 45° with respect to the optical axis of the light beam projected from said prism, and a pair of objective projection lenses mounted adjacent said second deflection mirror and inclined at an angle of 45° with respect to the reflective surface of said second deflection mirror, for directing light reflected from said second deflection mirror to the reflective surface of said pivotable mirror mounted adjacent said second aperture.

6. The combination as recited in claim 5, wherein said means for rotating said prism synchronously with the movement of the motion picture film comprises at least one sprocket wheel, affixed to said prism and disposed adjacent said film gate so that the sprockets of said sprocket wheel engage the perforations provided in the motion picture film, and thereby rotate said prism synchronously with the film to produce an optical standstill of the image projected.

7. The combination as recited in claim 6, wherein said prism is hexagonal in shape, and further comprising a deflection lens, disposed adjacent the end of said light guide rod between said rod and said film gate for directing the light transmitted by said rod to said film gate and the motion picture film.

* * * * *

UNITED STATES PATENT OFFICE
CERTIFICATE OF CORRECTION

Patent No. 3,690,749　　　　　　　　Dated September 12, 1972

Inventor(s) Ottmar Haberkern

It is certified that error appears in the above-identified patent and that said Letters Patent are hereby corrected as shown below:

Column 1, add --Claims priority, application Germany, September 22nd, 1969, P 19 48 484.5; and application Germany, October 6th, 1969, P 19 51 054.4--.

Signed and sealed this 6th day of March 1973.

(SEAL)
Attest:

EDWARD M. FLETCHER, JR.　　　　　ROBERT GOTTSCHALK
Attesting Officer　　　　　　　　　Commissioner of Patents